United States Patent
Wu et al.

(10) Patent No.: US 6,628,727 B1
(45) Date of Patent: Sep. 30, 2003

(54) APPARATUS AND METHOD FOR PERFORMING π/4-DQPSK BASEBAND MODULATION BASED ON A SIGNAL MAPPING TO BE SIMPLIFIED

(75) Inventors: Ming-Chou Wu, Taipei (TW); Hsu-Hsiang Tseng, Taoyuan (TW)

(73) Assignee: Syncomm Technology Corporation, Taoyuan (TW)

(*) Notice: Subject to any disclaimer, the term of this patent is extended or adjusted under 35 U.S.C. 154(b) by 0 days.

(21) Appl. No.: 09/480,219

(22) Filed: Jan. 10, 2000

(51) Int. Cl.[7] .............................................. H04L 27/10
(52) U.S. Cl. ........................ 375/281; 332/103; 375/308
(58) Field of Search ......................... 332/103; 375/279, 375/280, 281, 282, 283, 298, 302, 308, 271, 295, 300, 261

(56) References Cited

U.S. PATENT DOCUMENTS 5,369,378 A * 11/1994 Kosaka et al. .............. 332/104
5,528,631 A * 6/1996 Hayashi et al. ............. 375/283
5,604,770 A * 2/1997 Fetz .......................... 375/296

OTHER PUBLICATIONS

Rappaport, "Wireless Communications," 1996, Chapter 5, "Modulation Techniques for Mobile Radio," pp. 227–233, 238–242, 244–254.

* cited by examiner

Primary Examiner—Jean B. Corrielus
(74) Attorney, Agent, or Firm—Senniger, Powers, Leavitt & Roedel (57) ABSTRACT

The present invention is an apparatus and method for performing a π/4-DQPSK baseband modulation based on a signal mapping to be simplified. The apparatus mainly comprises a memory unit and as processing unit. The memory unit stores a plurality of parameters and their corresponding tabular data of a low pass filter, and the parameters and their corresponding tabular data are simplified in advance. The low pass filter is used for reducing the bandwidth of the apparatus and increasing the utilization of the bandwidth. The processing, unit bases on the input digital data and the tabular data in the memory unit to generate a digital in-phase signal $I_n$ and a digital quadrature-phase signal $Q_n$.

14 Claims, 7 Drawing Sheets

APPARATUS AND METHOD FOR PERFORMING π/4-DQPSK BASEBAND MODULATION BASED ON A SIGNAL MAPPING TO BE SIMPLIFIED

BACKGROUND OF THE INVENTION

1. Field of the Invention

The present invention relates to an apparatus and method for performing π/4-DQPSK (π/4-Differential Quadrature Phase Shift Keying) baseband modulation, and particularly to an apparatus and method for building and storing a plurality of parameters and their corresponding tabular data which are simplified previously and using the tabular data to rapidly and correctly modulate input signals.

2. Description of the Related Art

π/4-DQPSK baseband modulation is widespreadly used in digital wireless baseband modulating technology. For example, USDC and PACS system in North America, and PDC and PHS system in Japan all use π/4-DQPSK baseband modulation for the design foundation of system wireless modems. The main advantages of π/4-DQPSK baseband modulation are high utilization of bandwidth, high power utilization and easy to implement. The prior design flow of implementing π/4-DQPSK baseband modulation is described hereinafter. Firstly, signals I'(t) and Q'(t) were created through the signal mapping. Secondly, the results are separately sent to two low pass filters to generate in-phase signal I(t) and quadrature-phase signal Q(t). The above-mentioned technology is shown in "Wireless Communications," by Theodore S. Rappaport, Prentice Hall, Upper Saddle River, 1996. The prior art method has many disadvantages. For instance, two filters inside the apparatus need a lot of high-speed operations, so that the complexity of the circuit design, accumulation error and power

SUMMARY OF THE INVENTION

Accordingly, the object of the invention is to resolve the following drawbacks: (1) the conventional π/4-DQPSK baseband modulation uses complex mathematical operations to obtain the in-phase signal I(t) and the quadrature-phase signal Q(t), and (2) the parameters of conventional π/4-DQPSK baseband modulation can not be adjusted as desired. In order to accomplish the object, the present invention proposes an apparatus and method for performing π/4-DQPSK baseband modulation based on a signal mapping to be simplified. The present invention simplifies the definition and formula of the in-phase signal I(t) and quadrature-phase signal Q(t) in advance, and stores results and corresponding parameters into look-up tables inside a memory. Thus, the present invention only needs a simple logic and control circuit to find out the corresponding data in the memory, and calculates digital in-phase signal $I_n$ and digital quadrature-phase signal $Q_n$ through simple operations. After the process of digital-to-analog conversion, an analog in-phase signal I(t) and analog quadrature-phase signal Q(t) can be obtained. Besides, important parameters of the present invention, such as α (the roll-off factor of a raised cosine filter, the lager the value is, the faster a degeneration of the signal in time domain, and can use little bits to approach the ideal modulating apparatus), can be adjusted by the user to change the operating characteristic of the system. The present invention only needs small memory capacity, a little operations by the whole circuit, and a little operation time in computation. Therefore, the present invention can transmit data at a high speed. Furthermore, because various results are accurately calculated by the present invention in advance, the accumulation errors will be largely reduced. In conclusion, the present invention reduces the time of operations and memory space, and prevents the accumulation errors occurring easily in the conventional π/4-DQPSK baseband modulation.

The present invention in baseband modulating apparatus mainly comprises a memory unit and a processing unit. The memory unit stores a plurality of parameters and their corresponding tabular data of a low pass filter, and the parameters and their corresponding tabular data are simplified in advance. The low pass filter is used for reducing the bandwidth of the apparatus and increasing the utilization of the bandwidth. The processing unit bases on input digital data and the tabular data in the memory unit to generate the digital in-phase signal $I_n$ and the digital quadrature-phase signal $Q_n$.

The baseband modulating method of the present invention mainly comprises: the step of building and storing a plurality of parameters and their corresponding tabular data of a low pass filter, the parameters and their corresponding tabular data being simplified in advance, the low pass filter being used for reducing the bandwidth of the apparatus and increasing the utilization of the bandwidth; the step of sequentially recording the input digital data; the step of according to the input digital data, determining variance of phases after signals are mapped; the step of receiving the tabular data which are associated with the variance of phases; and the step of according to the received tabular data, generating a digital in-phase signal $I_n$ and a digital quadrature-phase signal $Q_n$.

The present invention also can be implemented by software. Because the present invention has the advantages of simple structure and less operations, the implementation by software also has the advantages.

BRIEF DESCRIPTION OF THE DRAWINGS

The present invention will be described according to the appended drawings in which.

PREFERRED EMBODIMENT OF THE PRESENT INVENTION

Figure 1:
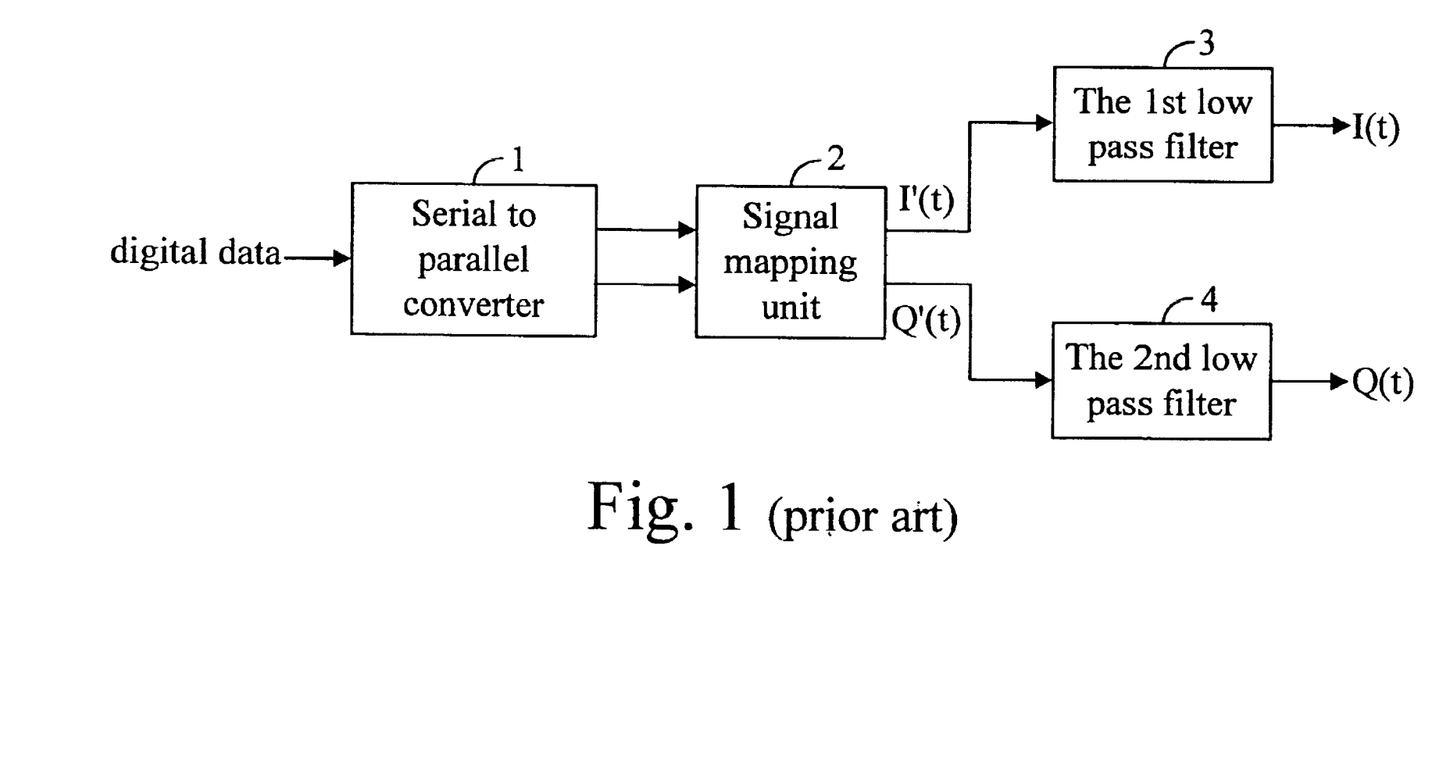
FIG. 1 is a block diagram of a prior art apparatus.

FIG. 1 is a block diagram of a prior art apparatus, wherein a symbol represents two bits, and thus it is necessary to separate input serial data including even and odd items into I channel and Q channel by a serial-to-parallel converter 1. I'(t) and Q'(t) are generated by signal mapping unit 2. I(t) and Q(t) are generated by the first low pass filter 3 and the second low pass filter 4. The disadvantages of the prior art apparatus are the large amount of high speed operations for the two low pass filters 3, 4, and thus the complexity of circuit design, accumulation error and amount of power consumption will be increased.

Table 1 is a signal mapping of a preferred embodiment of the present invention, and the mapping relationships between input data and output phases are shown.

TABLE 1

| symbol | $d_1$ | $d_0$ | $\theta_i - \theta_{i-1}$ |
|---|---|---|---|
| 0 | 0 | 0 | $\frac{\pi}{4}$ |
| 1 | 0 | 1 | $\frac{3\pi}{4}$ |
| 2 | 1 | 0 | $\frac{7\pi}{4}$ |
| 3 | 1 | 1 | $\frac{5\pi}{4}$ |

Figure 2:
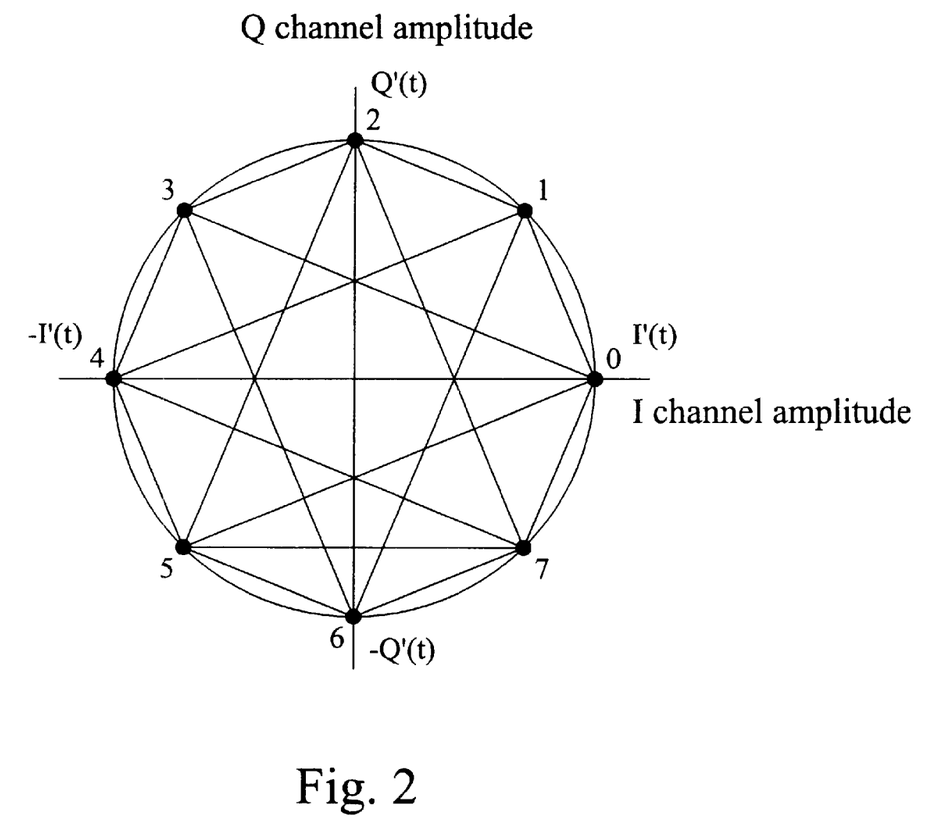
FIG. 2 is a constellation diagram of a preferred embodiment of the present invention.

(with headers: input data [$d_1$, $d_0$]; variation of output phase [$\theta_i - \theta_{i-1}$])

wherein $d_1$ and $d_0$ are input data of signal mapping, and $\theta_i$ represents the phase of the i-th symbol. According to input data and Table 1, a constellation diagram of $\pi/4$-DQPSK drawn and shown FIG. 2. After the process of signal mapping, I'(t) and Q'(t) will be generated and expressed as the following equations.

$$I'(t) = \sum_{i=-\infty}^{\infty} X_i \cdot \delta(t - i \cdot T_S) \qquad (1)$$

$$Q'(t) = \sum_{i=-\infty}^{\infty} Y_i \cdot \delta(t - i \cdot T_S) \qquad (2)$$

wherein $T_S$ represents time for transmitting a symbol, $X_i$ represents an in-phase signal corresponding to the signal mapping of the i-th symbol, and $Y_i$ represents a quadrature-phase signal corresponding to the signal mapping of the i-th symbol. The initial value of $\theta_i$ is equal to 0 if i=0. In other words, the radius of the initial phase is equals to zero (the position ⌈0⌋ shown in FIG. 2). If i is even, the parameters $X_i$ and $Y_i$ have only three possible values: $-1$, 0 and 1, and if any of the parameters is 1 or $-1$, the other one must be 0. If i is odd, the parameters $X_i$ and $Y_i$ have only two possible values:

$$\frac{1}{\sqrt{2}} \text{ and } -\frac{1}{\sqrt{2}}.$$

In conclusion, $X_i$ and $Y_i$ have only five possible values: $-1$, $$-\frac{1}{\sqrt{2}},$$

0, $$\frac{1}{\sqrt{2}}$$

and 1. The output modulating signals I(t) and Q(t) can be rewritten in the form of a complex function as equation (3).

$$I(t) + j \cdot Q(t) = [I'(t) * h_{LPF}(t)] + j \cdot [Q'(t) * h_{LPF}(t)] \qquad (3)$$

$$= \sum_{i=-\infty}^{\infty} (X_i + j \cdot Y_i) \cdot h_{LPF}(t - i \cdot T_S)$$

wherein $h_{LPF}(t)$ is a time domain response equation of a low pass filter.

According to the constellation diagram of FIG. 2, the relationships between $\theta_i$, $X_i$ and $Y_i$ are shown in Table 2.

TABLE 2

| g | Phase($\theta_i$) | $X_i$ | $S_{X,i}$ | $|X_i|$ | $Y_i$ | $S_{Y,i}$ | $|Y_i|$ |
|---|---|---|---|---|---|---|---|
| 0 | 0 | 1 | 1 | 1 | 0 | 0 | 1 |
| 1 | $\frac{\pi}{4}$ | $\frac{1}{\sqrt{2}}$ | 1 | $\frac{1}{\sqrt{2}}$ | $\frac{1}{\sqrt{2}}$ | 1 | $\frac{1}{\sqrt{2}}$ |
| 2 | $\frac{\pi}{2}$ | 0 | 0 | 1 | 1 | 1 | 1 |
| 3 | $\frac{3\cdot\pi}{4}$ | $-\frac{1}{\sqrt{2}}$ | $-1$ | $\frac{1}{\sqrt{2}}$ | $\frac{1}{\sqrt{2}}$ | 1 | $\frac{1}{\sqrt{2}}$ |
| 4 | $\pi$ | $-1$ | $-1$ | 1 | 0 | 0 | 1 |
| 5 | $\frac{5\cdot\pi}{4}$ | $-\frac{1}{\sqrt{2}}$ | $-1$ | $\frac{1}{\sqrt{2}}$ | $-\frac{1}{\sqrt{2}}$ | $-1$ | $\frac{1}{\sqrt{2}}$ |
| 6 | $\frac{3\cdot\pi}{2}$ | 0 | 0 | 1 | $-1$ | $-1$ | 1 |
| 7 | $\frac{7\cdot\pi}{4}$ | $\frac{1}{\sqrt{2}}$ | 1 | $\frac{1}{\sqrt{2}}$ | $-\frac{1}{\sqrt{2}}$ | $-1$ | $\frac{1}{\sqrt{2}}$ | wherein $X_i = \cos(\theta_i) = S_{X,i} \cdot |X_i|$, $Y_i = \sin(\theta_i) = S_{Y,i} \cdot |Y_i|$. It will be found in Table 2 that $|X_i| = |Y_i|$, and have only two possible values: 1 and $$\frac{1}{\sqrt{2}}.$$

$S_{I,i}$ and $S_{Q,i}$ have only three possible values: 0, 1 and $-1$.

The result $$\theta_i - \theta_{i-1} = k \cdot \frac{\pi}{4}$$

can be found in Table 1, wherein k is 1, 3, 5 or 7. Therefore, $\theta_i$ and $\theta_{i-1}$ will be interleaved at the phase position of the constellation diagram of FIG. 2. In other words, if $\theta_i$ is located at an even position, then $\theta_{i-1}$ is located at an odd position. If $\theta_i$ is located at an odd position, then $\theta_{i-1}$ is located at an even position. Depending on the above conclusion and Table 2, the equation (3) can be simplified as equation (4).

$$I_n + j \cdot Q_n = I(t_n) + j \cdot Q(t_n) = \quad (4)$$

$$\begin{cases} \ldots + (S_{X,-2} + j \cdot S_{Y,-2}) \cdot h_{LPF}(t_n + 2 \cdot T_S) + \\ (S_{X,-1} + j \cdot S_{Y,-1}) \cdot \frac{1}{\sqrt{2}} \cdot h_{LPF}(t_n + T_S) + \\ (S_{X,0} + j \cdot S_{Y,0}) \cdot h_{LPF}(t) + (S_{X,1} + j \cdot S_{Y,1}) \cdot \\ \frac{1}{\sqrt{2}} \cdot h_{LPF}(t_n - T_S) + \\ (S_{X,2} + j \cdot S_{Y,2}) \cdot h_{LPF}(t_n - 2 \cdot T_S) + \ldots \, , \\ \ldots + (S_{X,-2} + j \cdot S_{Y,-2}) \cdot \frac{1}{\sqrt{2}} \cdot h_{LPF}(t_n + 2 \cdot T_S) + \\ (S_{X,-1} + j \cdot S_{Y,-1}) \cdot h_{LPF}(t_n + T_S) + \\ (S_{X,0} + j \cdot S_{Y,0}) \cdot \frac{1}{\sqrt{2}} \cdot h_{LPF}(t_n) + (S_{X,1} + j \cdot S_{Y,1}) \cdot \quad m = \text{even} \\ h_{LPF}(t_n - T_S) + (S_{X,2} + j \cdot S_{Y,2}) \cdot \frac{1}{\sqrt{2}} \cdot \\ h_{LPF}(t_n - 2 \cdot T_S) + \ldots \, , \end{cases}$$

wherein $$\theta_1 = m \cdot \frac{\pi}{4},$$

$\theta_1$ represents the output phase of signal mapping when the first symbol (i=1) is processed; the value of m is between 0~7, representing the phase numbering system of $\theta_1$ in FIG. 2; $I_n = I(t_n)$, $Q_n = Q(t_n)$; $X_i = \cos(\theta_i) = S_{X,i} \cdot |X_i|$, $Y_i = \sin(\theta_i) = S_{Y,i} \cdot |Y_i|$;

$$t_n = \left\{ \frac{2 \cdot n + 1}{2 \cdot M} - \frac{1}{2} \right\} \cdot T_S, \, 0 \leq n \leq M - 1,$$

$T_S$ represents time for transmitting a symbol, M represents a totally sampled number in the time for transmitting one symbol, symbol " . . . " represents infinite expansion, j is a symbol for the imaginary part of a complex operation, m is a phase serial number of a symbol, and n is a serial number of a sampling point in the time for transmitting one symbol.

If the time period is limited to $$-\frac{T_S}{2} \leq t < \frac{T_S}{2},$$

and the more time domain response $h_{LPF}(t)$ of a low pass filter spents, and the less signal strength is. The part of the range between (−K)-th to K-th symbols are considered only and the part of small signals can be neglected, and thus a simple equation can be used to approximate the original equation. In general, the more amount of the symbols, the more accurate the equation is and the more hardware cost is. In general, if α is bigger than 0.75, then K=1, representing only observing the effect on outputs due to output the (−1)-th to 1-th symbols; and if α is smaller than 0.75, then K=2, representing only observing the effect on outputs due to the (−2)-th to 2-th symbols.

While K=1, the equation (4) will approximate an equation (5) as following:

$$I_n + j \cdot Q_n \cong \quad (5)$$

$$\begin{cases} (S_{X,-1} + j \cdot S_{Y,-1}) \cdot \frac{1}{\sqrt{2}} \cdot h_{LPF}(t_n + T_S) + (S_{X,0} + j \cdot S_{Y,0}) \cdot \\ h_{LPF}(t) + (S_{X,1} + j \cdot S_{Y,1}) \cdot \frac{1}{\sqrt{2}} \cdot h_{LPF}(t_n - T_S), \quad m = \text{odd} \\ (S_{X,-1} + j \cdot S_{Y,-1}) \cdot h_{LPF}(t_n + T_S) + (S_{X,0} + j \cdot S_{Y,0}) \cdot \frac{1}{\sqrt{2}} \cdot \\ h_{LPF}(t_n) + (S_{X,1} + j \cdot S_{Y,1}) \cdot h_{LPF}(t_n - T_S) +, \quad m = \text{even} \end{cases}$$

While K=2, the equation (4) will approximate an equation (6) as follows:

$$I_n + j \cdot Q_n = \quad (6)$$

$$\begin{cases} (S_{X,-2} + j \cdot S_{Y,-2}) \cdot h_{LPF}(t_n + 2 \cdot T_S) + \\ (S_{X,-1} + j \cdot S_{Y,-1}) \cdot \frac{1}{\sqrt{2}} \cdot h_{LPF}(t_n + T_S) + \\ (S_{X,0} + j \cdot S_{Y,0}) \cdot h_{LPF}(t) + (S_{X,1} + j \cdot S_{Y,1}) \cdot \frac{1}{\sqrt{2}} \cdot \quad m = \text{odd} \\ h_{LPF}(t_n - T_S) + (S_{X,2} + j \cdot S_{Y,2}) \cdot h_{LPF}(t_n - 2 \cdot T_S), \\ (S_{X,-2} + j \cdot S_{Y,-2}) \cdot \frac{1}{\sqrt{2}} \cdot h_{LPF}(t_n + 2 \cdot T_S) + \\ (S_{X,-1} + j \cdot S_{Y,-1}) \cdot h_{LPF}(t_n + T_S) + \\ (S_{X,0} + j \cdot S_{Y,0}) \cdot \frac{1}{\sqrt{2}} \cdot h_{LPF}(t_n) + (S_{X,1} + j \cdot S_{Y,1}) \cdot \quad m = \text{even} \\ h_{LPF}(t_n - T_S) + (S_{X,2} + j \cdot S_{Y,2}) \cdot \frac{1}{\sqrt{2}} \cdot h_{LPF}(t_n - 2 \cdot T_S), \end{cases}$$

In the equation (5) and equation (6), it will be found that at a specific time period $$-\frac{T_S}{2} \leq t < \frac{T_S}{2},$$

equations corresponding to an odd value of a parameter m are interleaved by the equations corresponding to an even value of a parameter m $$\frac{1}{\sqrt{2}}$$

times. Because the multiple is a constant, the implementation of such a circuit is less complex than that of a general purpose multiplier. In the way of implementation of such a less complex circuit, one of the choices is to store sampling points of a curve formed by equation (4) into ROM. Another choice is to store sampling points of a curve formed by even or odd m parameters of the equation (4) into ROM. The sampling points of the another m parameters of a curve formed by equation (4) are obtained by the constant multiple described as above. For example, the constant multiplier has a multiple $$\frac{1}{\sqrt{2}},$$

which uses sampling points of a curve formed by $h_{LPF}(t_n + K \cdot T_S)$ to generate sampling points of a curve formed by $$\frac{1}{\sqrt{2}} h_{LPF}(t_n + K \cdot T_S),$$

uses sampling points of a curve formed by $h_{LPF}(t_n+(K-1)T_S)$ to generate sampling points of a curve formed by $$\frac{1}{\sqrt{2}} h_{LPF}(t_n + (K-1)T_S),$$

uses sampling points of a curve formed by $h_{LPF}(t_n+(K-2)\cdot T_S)$ to generate sampling points of a curve formed by $$\frac{1}{\sqrt{2}} h_{LPF}(t_n + (K-2) \cdot T_S),$$

in the same manner, uses sampling points of a curve formed by $h_{LPF}(t_n-(K-1)\cdot T_S)$ to generate the sampling points of a curve formed by $$\frac{1}{\sqrt{2}} h_{LPF}(t_n - (K-1) \cdot T_S),$$

and uses sampling points of a curve formed by $h_{LPF}(t_n-K\cdot T_S)$ to generate the sampling points of a curve formed by $$\frac{1}{\sqrt{2}} \cdot h_{LPF}(t_n - K \cdot T_S),$$

wherein K is a positive integer. Another example is to use another set of (2K+1) look-up tables (not shown in FIGS.), wherein the first look-up table stores sampling points of a curve formed by $$\frac{1}{\sqrt{2}} h_{LPF}(t_n + K \cdot T_S),$$

the second look-up table stores sampling points of a curve formed by $$\frac{1}{\sqrt{2}} h_{LPF}(t_n + (K-1)T_S),$$

the third look-up table stores sampling points of a curve formed by $$\frac{1}{\sqrt{2}} h_{LPF}(t_n + (K-2) \cdot T_S),$$

in the same manner, the 2K-th look-up table stores sampling points of a curve formed by $$\frac{1}{\sqrt{2}} h_{LPF}(t_n - (K-1) \cdot T_S),$$

and the (2K+1)-th look-up table stores sampling points of a curve formed by $$\frac{1}{\sqrt{2}} h_{LPF}(t_n - K \cdot T_S).$$

The low pass filters generally applied in $\pi/4$-DQPSK modulation are a Raised Cosine Filter or Root Raised Cosine Filter, and their modulations complies with the Nyquist's Pulse-Shaping Criterion. There is no InterSymbol Interference (ISI) generated in ideal sampling, situation, and thus both modulations are widely used in communication modulation. The following analysis is an example of the raised cosine filter with roll-off factor $\alpha=0.5$.

Figure 3A:
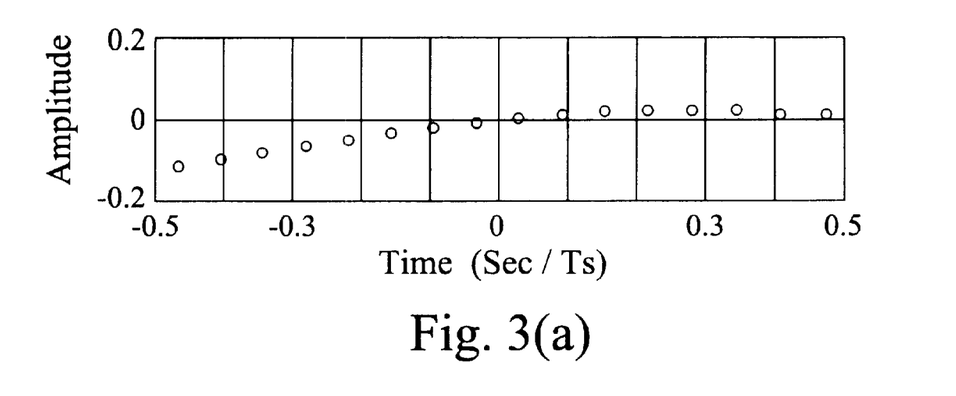
FIGS. 3(a)–3(e) are a sampling diagram of a preferred embodiment of the present invention.
Figure 3B:
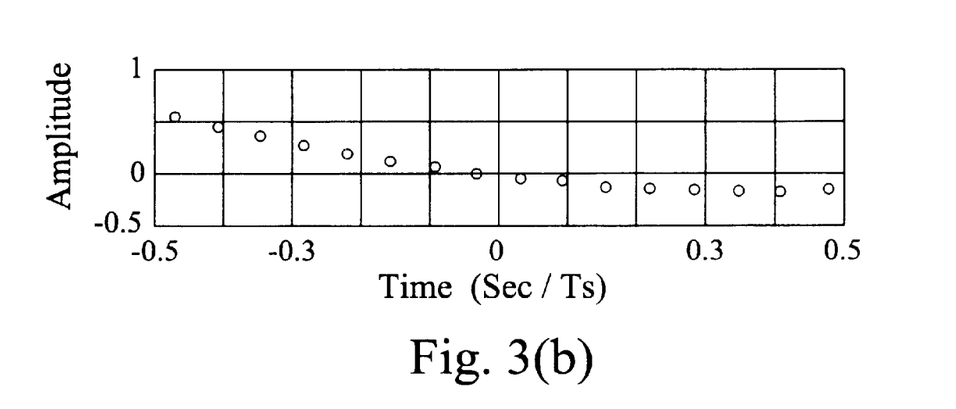
Figure 3C:
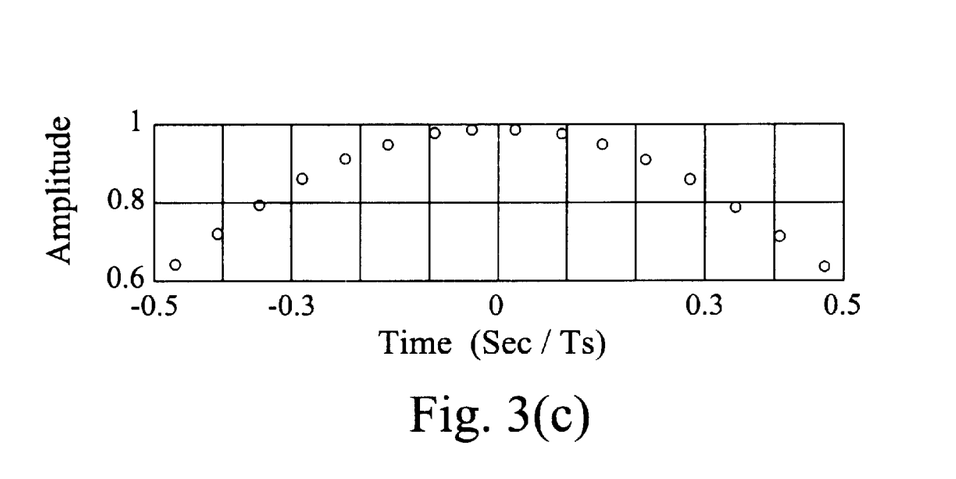
Figure 3D:
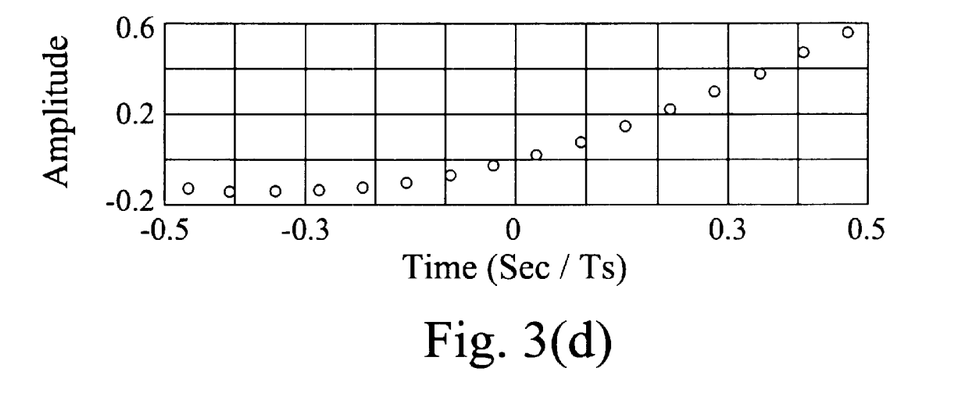
Figure 3E:
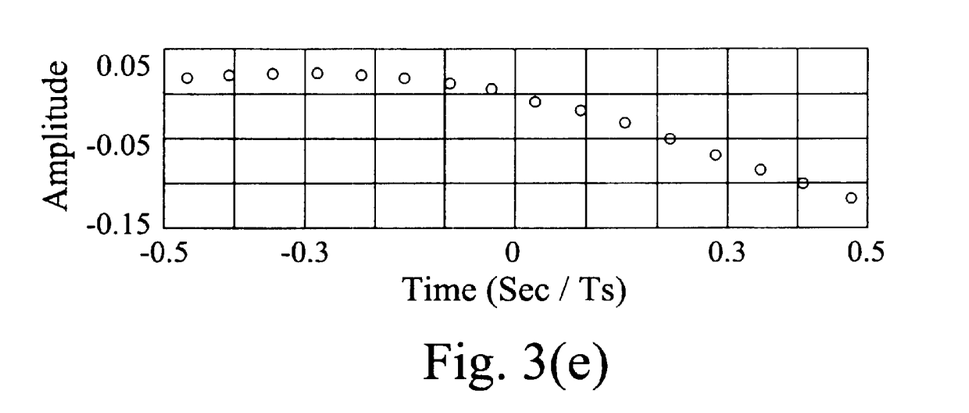

If the parameters K=2 and M=16; which means that the sampling frequency is sixteen times of the symbol transmitting frequency and if $h_{RC}(t)$ is used to represent the response equation of the raised cosine filter, wherein $h_{RC}(t)$ corresponds to $h_{LPF}(t)$ of equation (5) and equation (6), the low pass filter is used for reducing the bandwidth of the present invention and increases the utilization of the bandwidth. FIG. 3(a) shows the characteristic of the curve $h_{RC}(t_n+2\cdot T_S)$ after sampling. FIG. 3(b) shows the characteristic of the curve $h_{RC}(t_n+T_S)$ after sampling. FIG. 3(c) shows the characteristic of the curve $h_{RC}(t_n)$ after sampling. FIG. 3(d) shows the characteristic of the curve $h_{RC}(t_n-T_S)$ after sampling. FIG. 3(e) shows the characteristic of the curve $h_{RC}(t_n-2\cdot T_S)$ after sampling.

The sampling points of the curve formed in FIG. 3(a) are horizontally symmetrical with the sampling points of the curve formed in FIG. 3(e). The sampling points of the curve formed in FIG. 3(b) are horizontally symmetrical with the sampling points of the curve formed in FIG. 3(d). The sampling points of the curve formed in FIG. 3(c) are horizontally symmetrical themselves. Because of the above-mentioned symmetric characteristic, the memory space for storing the sampling points can be reducing one half of the original space. If every curve stores sampling points of both conditions in equation (5) and equation (6), every sampling point is quantitatively represented by G bits, and thus the total ROM space is $(2\cdot K+1)\cdot M\cdot G$ bits.

Figure 4:
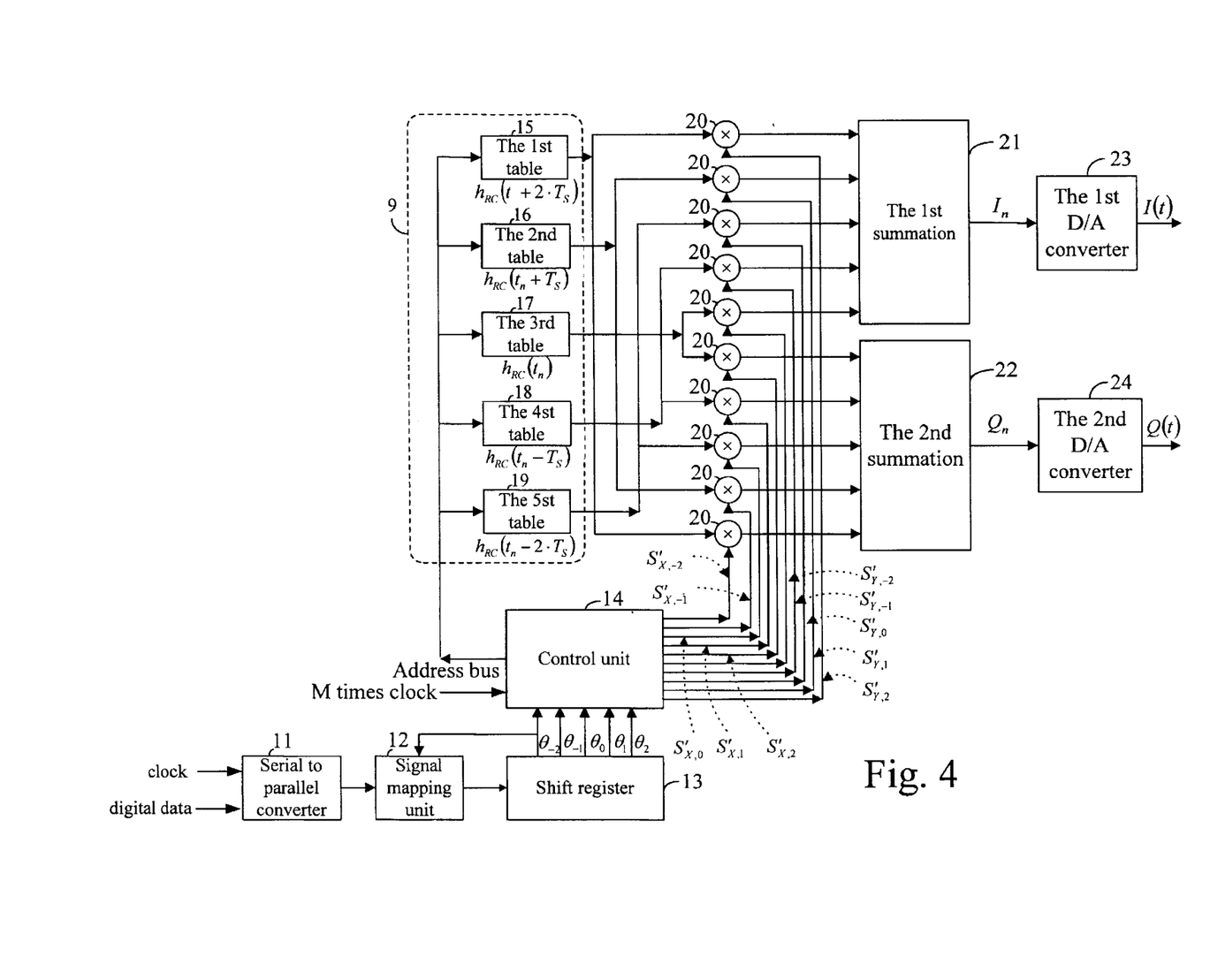
FIG. 4 is a block diagram of a preferred embodiment of the present invention.

FIG. 4 is a block diagram of a preferred embodiment of the present invention. Because in $\pi/4$-DQPSK modulation every symbol contains two-bit information, there is a need for a serial-to-parallel converter 11 to transfer serial digital data to parallel data. Subsequently, the parallel data are sent the a signal mapping unit 12 which uses simple sequential logic to implement the function of Table 1. A shift register 13 connected to signal mapping unit 12 is used to record a plurality of recently received phase data for conveniently generating tabular addresses and control signals by a control unit 14 which implements the function of Table 2. When the order of sampling bit is less or equal to one half of the totally sampling number M, the parameters of $S'_{X,i}$ is equal to $S_{X,i}$ and $S'_{Y,i}$ is equal to $S_{Y,i}$. When the order of sampling bits is larger than one half of the totally sampling number M, the parameters of $S'_{X,i}$ is equal to $S_{X,-i}$, and $S'_{Y,i}$ is equal to $S_{Y,-i}$.

The first to the fifth look-up tables 15~19 are collectively called as memory unit 9, which is mainly used to record the sampling points of a low pass filter corresponding to time domain response of different symbols. For example, the first unit 15 stores the sampling data of the curve formed by $h_{RC}(t_n+2\cdot T_S)$, the second table 16 stores the sampling data of the curve formed by $h_{RC}(t_n+T_S)$, the third table 17 stores the sampling data of the curve formed by $h_{RC}(t_n)$, the forth table 18 stores the sampling data of the curve formed by $h_{RC}(t_n-T_S)$, the fifth table 19 stores the sampling data of the curve formed by $h_{RC}(t_n-2\cdot T_S)$. The ten multipliers 20 shown in the FIG. 4 are all a processing unit for simply multiplying ±1 or 0 to implement the function of $S'_{X,i}$ and $S'_{Y,i}$. The first summation unit 21 and the second summation unit 22 are connected to the multipliers 20 to implement the functions of equation (5) and equation (6), so as to obtain signals $I_n$ and $Q_n$. Optionally, the signal $I_n$ goes through the first digital-to-analog converter 23 to get a signal I(t), and the signal $Q_n$ goes through the second digital-to-analog converter 24 to get a signal Q(t).

Figure 5:
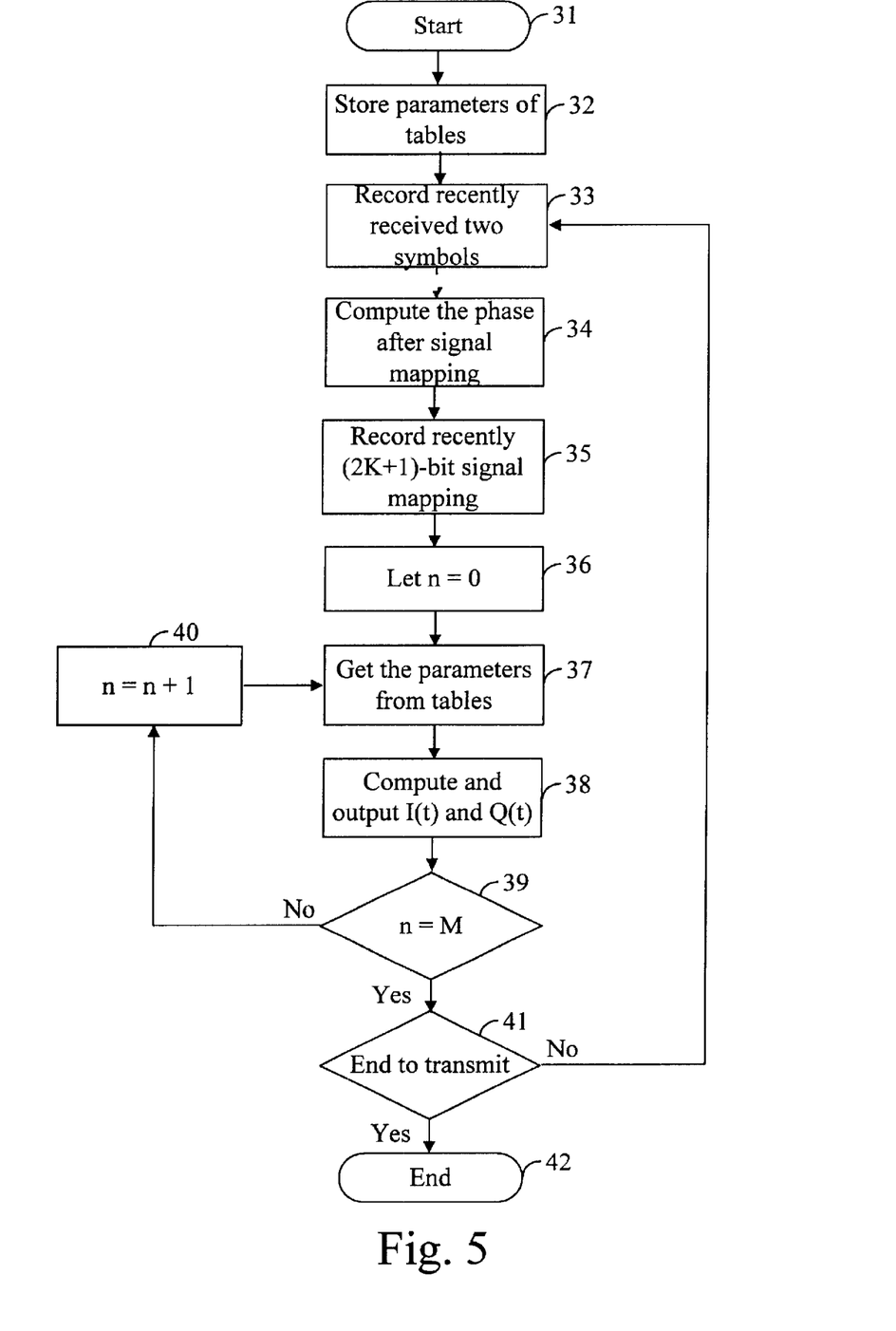
FIG. 5 is a flow diagram of a preferred embodiment of the present invention.

The operating flow diagram of the present invention is shown in FIG. 5. The method of the present invention begins with step 31. In step 32, according to the requirement of the system, the operator builds up and stores a plurality of parameters of a low pass filter and the tabular data corresponding to the parameters in the plurality of look-up tables 15~19. In step 33, recently received (2K+1) symbols of input digital data are stored. In step 34, a corresponding phase is determined after signal mapping. In step 35, the recently received plurality of corresponding phases are recorded. Subsequently, the flow enters a sampling procedure. In step 36, let the sampling bit order be equal to zero. In step 37, a corresponding value is received from a plurality of look-up tables. In step 38, the baseband in-phase signal I(t) and quadrature-phase signal Q(t) are calculated and output. In step 39, whether the sampling order is the last one is determined. If the answer is no, in step 40, the sampling order is increased by one, and the flow returns to step 37. If the answer is yes, in step 41, whether the signal transmitting process is to be ended is determined. If the answer is no, then the flow returns to steps 33. If the answer is yes, in step 42, then the flow is terminated.

Figure 6:
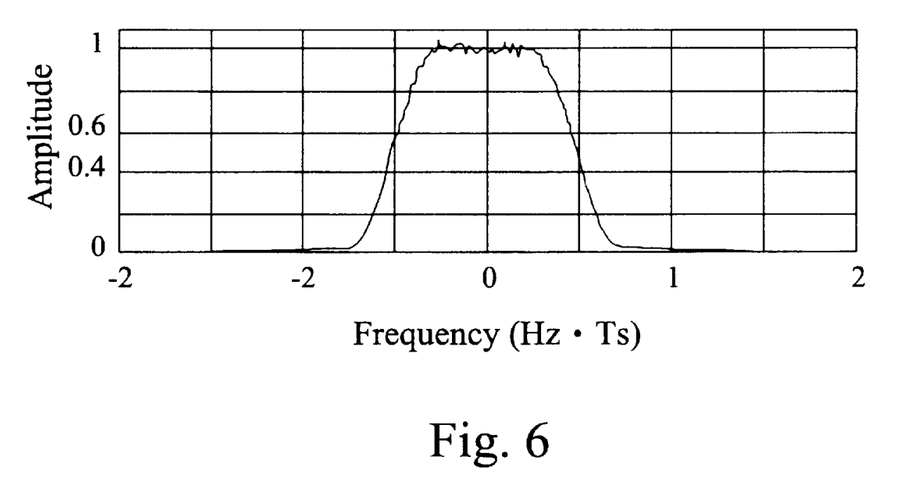
FIG. 6 is a spectrum diagram of a preferred embodiment of the present invention.
Figure 7:
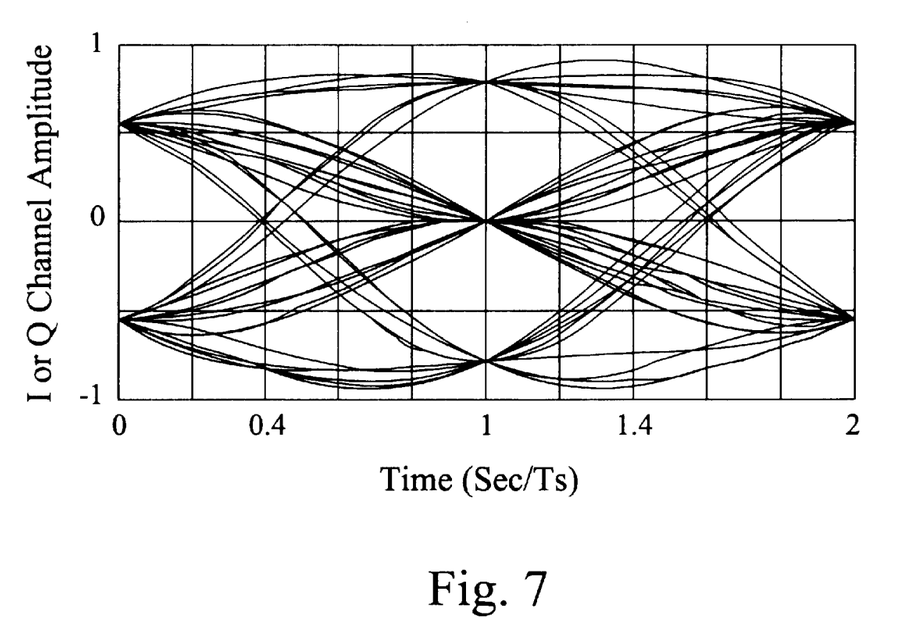
FIG. 7 is an eye diagram of a preferred embodiment of the present invention.

The simulated results of the present invention under the conditions: parameter α=0.5, M=10 and G=12 are shown in FIG. 6. FIG. 6 is a spectrum diagram of the simulated results. FIG. 7 is an eye-like diagram of the simulated results.

The present invention can also be implemented by software, because of simplicity and less operations of the structure. The implementation by software also has the above-mentioned advantages.

The present invention for performing π/4-DQPSK baseband modulation based on a signal mapping to be simplified can be saved in any computer readable storage medium, such as floppy, compact disk, hard disk or any kind of memory.

The above-described embodiments of the present invention are intended to be illustrated only. Numerous alternative embodiments may be devised by those skilled in the art without departing from the scope of the following claims.

What is claimed is:

1. An apparatus for performing π/4-DQPSK baseband modulation based on a signal mapping to be simplified, used to modulate input data into a digital in-phase signal $I_n$ and a digital quadrature-phase signal $Q_n$, comprising:

a memory unit which stores a plurality of parameters and corresponding tabular data being simplified in advance; and a processing unit which generates said digital in-phase $I_n$ and said digital quadrature-phase signal $Q_n$ based on said input digital data and the tabular data in said memory unit, said digital in-phase signal $I_n$ and said digital quadrature-phase signal $Q_n$ being generated by the following equations:

$$I_n + j \cdot Q_n = I(t_n) + j \cdot Q(t_n) =$$

$$\begin{cases} \begin{aligned} &\ldots + (S_{X,-2} + j \cdot S_{Y,-2}) \cdot h_{LPF}(t_n + 2 \cdot T_S) + \\ &(S_{X,-1} + j \cdot S_{Y,-1}) \cdot \frac{1}{\sqrt{2}} \cdot h_{LPF}(t_n + T_S) + \\ &(S_{X,0} + j \cdot S_{Y,0}) \cdot h_{LPF}(t) + \\ &(S_{X,1} + j \cdot S_{Y,1}) \cdot \frac{1}{\sqrt{2}} \cdot h_{LPF}(t_n - T_S) + \quad m = \text{odd} \\ &(S_{X,2} + j \cdot S_{Y,2}) \cdot h_{LPF}(t_n - 2 \cdot T_S) + \ldots, \\ &\ldots + (S_{X,-2} + j \cdot S_{Y,-2}) \cdot \frac{1}{\sqrt{2}} \cdot \\ &h_{LPF}(t_n + 2 \cdot T_S) + \\ &(S_{X,-1} + j \cdot S_{Y,-1}) \cdot h_{LPF}(t_n + T_S) + \\ &(S_{X,0} + j \cdot S_{Y,0}) \cdot \frac{1}{\sqrt{2}} \cdot h_{LPF}(t_n) + \\ &(S_{X,1} + j \cdot S_{Y,1}) \cdot h_{LPF}(t_n - T_S) + \quad m = \text{even} \\ &(S_{X,2} + j \cdot S_{Y,2}) \cdot \frac{1}{\sqrt{2}} \cdot h_{LPF}(t_n - 2 \cdot T_S) + \ldots, \end{aligned} \end{cases}$$

wherein $I_n$ is equal to $I(t_n)$, $Q_n$ is equal to $Q(t_n)$, $h_{LPF}(t)$ is a time domain response equation of a low pass filter, $S_{X,i}$ is an operation sign of $X_i$, i is an integer, $S_{Y,i}$ is an operation sign of $Y_i$, $X_i$ represents an in-phase signal corresponding to the signal mapping of the i-th symbol, $Y_i$ represents a quadrature-phase signal corresponding to the signal mapping of the i-th symbol, $$t_n = \left\{ \frac{2 \cdot n + 1}{2 \cdot M} - \frac{1}{2} \right\} \cdot T_S, \ 0 \le n \le M - 1,$$

$T_S$ represents time for transmitting a symbol, M represents a sampled number in the time for transmitting one symbol, symbol " . . . " represents infinite expansion, j is a symbol for the imaginary part of a complex operation, m is a phase serial number of a symbol, and n is a serial number of a sampling point in the time for transmitting one symbol.

2. The apparatus of claim 1, wherein said processing unit comprises:

a serial-to-parallel converter for converting the input digital data into parallel data;

a signal mapping unit, connected to said serial-to-parallel converter, for converting said parallel data into variations in output phases; and a control unit, connected to said signal mapping unit and said memory unit for generating control signals and access addresses of said memory unit.

3. The apparatus of claim 1, further comprising a plurality of digital-to-analog converters for converting said digital in-phase signal $I_n$ into an analog in-phase signal I(t) and converting said digital quadrature-phase signal $Q_n$ into an analog quadrature-phase signal Q(t).

4. The apparatus of claim 1, wherein said memory unit comprises (2K+1) look-up tables, wherein the first look-up table stores sampling points of a curve formed by $h_{LPF}(t_n + K \cdot T_S)$, the second look-up table stores sampling points of a curve formed by $h_{LPF}(t_n + (K-1)T_S)$, the third look-up table stores sampling stores sampling points of a curve formed by $h_{LPF}(t_n + (K-2) \cdot T_S)$; in the same manner, the (2K)th look-up table stores sampling points of a curve formed by $h_{LPF}(t_n -$ (K−1)·T$_S$), the (2K+1)th look-up table stores sampling points of a curve formed by h$_{LPF}$(t$_n$−K·T$_S$), wherein K is a positive integer.

5. The apparatus of claim 2, wherein said processing unit further comprises a shift register, connected to said control unit and said signal mapping unit, for recording the variations from the signal mapping unit.

6. The apparatus of claim 1, wherein said processing unit further comprises a plurality of multipliers, connected to said memory unit, when the tabular data stored in said memory unit has opposite operation signs, only the part of positive operation sign is saved, and the part of negative operation sign is obtained through said multipliers.

7. The apparatus of claim 4, wherein said processing unit further comprises a multiplier having a multiple $$\frac{1}{\sqrt{2}},$$

which uses the sampling points of a curve formed by h$_{LPF}$(t$_n$+K·T$_S$) to generate sampling points of a curve formed by $$\frac{1}{\sqrt{2}} h_{LPF}(t_n + K \cdot T_S),$$

uses the sampling points of a curve formed by h$_{LPF}$(t$_n$+(K−1)T$_S$) to generate sampling points of a curve formed by $$\frac{1}{\sqrt{2}} h_{LPF}(t_n + (K-1)T_S),$$

uses the sampling points of a curve formed by h$_{LPF}$(t$_n$+(K−2)·T$_S$) to generate sampling points of a curve formed by $$\frac{1}{\sqrt{2}} h_{LPF}(t_n + (K-2) \cdot T_S),$$

in the same manner, uses the sampling points of a curve formed by h$_{LPF}$(t$_n$−(K−1)·T$_S$) to generate the sampling points of a curved formed by $$\frac{1}{\sqrt{2}} h_{LPF}(t_n - (K-1) \cdot T_S),$$

and uses the sampling points of a curve formed by h$_{LPF}$(t$_n$−K·T$_S$) to generate the sampling points of a curve formed by $$\frac{1}{\sqrt{2}} \cdot h_{LPF}(t_n - K \cdot T_S).$$

8. The apparatus of claim 1, wherein said memory unit further comprises a set of (2K+1) look-up tables, wherein the first look-up table stores the sampling points of a curve formed by $$\frac{1}{\sqrt{2}} h_{LPF}(t_n + K \cdot T_S),$$

the second look-up table stores the sampling points of a curve formed by $$\frac{1}{\sqrt{2}} h_{LPF}(t_n + (K-1)T_S),$$

the third look-up table stores the sampling points of a curve formed by $$\frac{1}{\sqrt{2}} h_{LPF}(t_n + (K-2) \cdot T_S),$$

in the same manner, the 2K-th look-up table stores the sampling points of a curve formed by $$\frac{1}{\sqrt{2}} h_{LPF}(t_n - (K-1) \cdot T_S),$$

and the (2K+1)-th look-up table stores the sampling points of a curve formed by $$\frac{1}{\sqrt{2}} h_{LPF}(t_n - K \cdot T_S).$$

9. The apparatus of claim 4, wherein said processing unit further comprises a plurality of summation units for accumulating the outputs of said plurality of look-up tables.

10. A method for performing π/4-DQPSK baseband modulation based on a signal mapping to be simplified, the method being applied in a communication system and used to modulate input digital data into a digital in-phase signal I$_n$ and a digital quadrature-phase signal Q$_n$, said method comprising the following steps:

(a) building and storing a plurality of parameters and corresponding tabular data being simplified in advance;

(b) recording said input digital data;

(c) according to said input digital data, determining variations in output phases after the signal mapping;

(d) receiving the tabular data which are associated with said variations in the output phases; and (e) according to said tabular data, generating said digital in-phase signal I$_n$ and said digital quadrature-phase signal Q$_n$ by using the following equation:

$$I_n + j \cdot Q_n = I(t_n) + j \cdot Q(t_n) =$$

$$\begin{cases} \ldots + (S_{X,-2} + j \cdot S_{Y,-2}) \cdot h_{LPF}(t_n + 2 \cdot T_S) + \\ (S_{X,-1} + j \cdot S_{Y,-1}) \cdot \frac{1}{\sqrt{2}} \cdot h_{LPF}(t_n + T_S) + \\ (S_{X,0} + j \cdot S_{Y,0}) \cdot h_{LPF}(t) + \\ (S_{X,1} + j \cdot S_{Y,1}) \cdot \frac{1}{\sqrt{2}} \cdot h_{LPF}(t_n - T_S) + \quad m = \text{odd} \\ (S_{X,2} + j \cdot S_{Y,2}) \cdot h_{LPF}(t_n - 2 \cdot T_S) + \ldots, \\ \ldots + (S_{X,-2} + j \cdot S_{Y,-2}) \cdot \frac{1}{\sqrt{2}} \cdot \\ h_{LPF}(t_n + 2 \cdot T_S) + \\ (S_{X,-1} + j \cdot S_{Y,-1}) \cdot h_{LPF}(t_n + T_S) + \\ (S_{X,0} + j \cdot S_{Y,0}) \cdot \frac{1}{\sqrt{2}} \cdot h_{LPF}(t_n) + \\ (S_{X,1} + j \cdot S_{Y,1}) \cdot h_{LPF}(t_n - T_S) + \quad m = \text{even} \\ (S_{X,2} + j \cdot S_{Y,2}) \cdot \frac{1}{\sqrt{2}} \cdot h_{LPF}(t_n - 2 \cdot T_S) + \ldots, \end{cases}$$

wherein $I_n$ is equal to $I(t_n)$, $Q_n$ is equal to $Q(t_n)$, $h_{LPF}(t)$ is a time domain response equation of a low pass filter, $S_{X,i}$ is an operation sign of $X_i$, i is an integer, $S_{Y,i}$ is an operation sign of $Y_i$, $X_i$ represents an in-phase signal corresponding to the signal mapping of the i-th symbol, $Y_i$ represents a quadrature-phase signal corresponding to the signal mapping of the i-th symbol, $$t_n = \left\{ \frac{2 \cdot n + 1}{2 \cdot M} - \frac{1}{2} \right\} \cdot T_S, \; 0 \leq n \leq M - 1,$$

$T_S$ represents time for transmitting a symbol, M represents a sampled number in the time for transmitting one symbol, symbol " . . . " represents infinite expansion, j is a symbol for the imaginary part of a complex operation, m is a phase serial number of a symbol, and n is a serial number of a sampling point in the time for transmitting one symbol.

11. The method of claim 10, wherein said tabular data has the property of horizontal symmetry, which enables a first half part of the table to be generated by a second half part of the table.

12. The method of claim 11, wherein only the second half part of the table is built and stored in step (a).

13. A computer readable storage medium for recording a method for performing π/4-DQPSK baseband modulation based on a signal mapping to be simplified, the method being applied in a communication system and used to modulate input digital data into digital in-phase signal $I_n$ and digital quadrature-phase signal $Q_n$, said method comprising the following steps:

(a) building and storing a plurality of parameters and corresponding tabular data from a low pass filter being simplified in advance;

(b) recording said input digital data;

(c) according to said input digital data, determining variations in output phases after the signal mapping;

(d) receiving the tabular data which are associated with said variations in the output phases; and (e) according to said tabular data, generating said digital in-phase signal $I_n$ and said digital quadrature-phase signal $Q_n$ by using the following equation:

$$I_n + j \cdot Q_n = I(t_n) + j \cdot Q(t_n) =$$

$$\begin{cases}
\begin{aligned}
&\ldots + (S_{X,-2} + j \cdot S_{Y,-2}) \cdot h_{LPF}(t_n + 2 \cdot T_S) + \\
&(S_{X,-1} + j \cdot S_{Y,-1}) \cdot \frac{1}{\sqrt{2}} \cdot h_{LPF}(t_n + T_S) + \\
&(S_{X,0} + j \cdot S_{Y,0}) \cdot h_{LPF}(t) + \\
&(S_{X,1} + j \cdot S_{Y,1}) \cdot \frac{1}{\sqrt{2}} \cdot h_{LPF}(t_n - T_S) + \quad m = \text{odd}\\
&(S_{X,2} + j \cdot S_{Y,2}) \cdot h_{LPF}(t_n - 2 \cdot T_S) + \ldots, \\
&\ldots + (S_{X,-2} + j \cdot S_{Y,-2}) \cdot \frac{1}{\sqrt{2}} \cdot \\
&h_{LPF}(t_n + 2 \cdot T_S) + \\
&(S_{X,-1} + j \cdot S_{Y,-1}) \cdot h_{LPF}(t_n + T_S) + \\
&(S_{X,0} + j \cdot S_{Y,0}) \cdot \frac{1}{\sqrt{2}} \cdot h_{LPF}(t_n) + \\
&(S_{X,1} + j \cdot S_{Y,1}) \cdot h_{LPF}(t_n - T_S) + \quad m = \text{even}\\
&(S_{X,2} + j \cdot S_{Y,2}) \cdot \frac{1}{\sqrt{2}} \cdot h_{LPF}(t_n - 2 \cdot T_S) + \ldots,
\end{aligned}
\end{cases}$$

wherein $I_n$ is equal to $I(t_n)$, $Q_n$ is equal to $Q(t_n)$, $h_{LPF}(t)$ is a time domain response equation of a low pass filter, $S_{X,i}$ is an operation sign of $X_i$, i is an integer, $S_{Y,i}$ is an operation sign of $Y_i$, $X_i$ represents an in-phase signal corresponding to the signal mapping of the i-th symbol, $Y_i$ represents a quadrature-phase signal corresponding to the signal mapping of the i-th symbol, $$t_n = \left\{ \frac{2 \cdot n + 1}{2 \cdot M} - \frac{1}{2} \right\} \cdot T_S, \; 0 \leq n \leq M - 1,$$

$T_S$ represents time for transmitting a symbol, M represents a sampled number in the time for transmitting one symbol, symbol " . . . " represents infinite expansion, j is a symbol for the imaginary part of a complex operation, m is a phase serial number of a symbol, and n is a serial number of a sampling point in the time for transmitting one symbol.

14. The medium of claim 13, wherein the parameters and tabular data include the sampling points of a curve formed by $h_{LPF}(t_n+2 \cdot T_S)$, $h_{LPF}(t_n+T_S)$, $h_{LPF}(t_n)$, $h_{LPF}(t_n-T_S)$ and $h_{LPF}(t_n-2 \cdot T_S)$.

* * * * *